United States Patent
Zakrzewski et al.

(10) Patent No.: US 9,154,249 B2
(45) Date of Patent: Oct. 6, 2015

(54) SYSTEM AND METHOD FOR SYNCHRONIZING WIRELESS DEVICES WITHOUT SENDING TIMESTAMP DATA

(75) Inventors: Radoslaw R. Zakrzewski, South Burlington, VT (US); Michael A. Lynch, Shelburne, VT (US); Brandon Hicks, Ferrisburgh, VT (US); Garret Edward Rittenhouse, Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 772 days.

(21) Appl. No.: 13/495,565

(22) Filed: Jun. 13, 2012

(65) Prior Publication Data
US 2013/0336205 A1    Dec. 19, 2013

(51) Int. Cl.
*H04W 4/00* (2009.01)
*H04J 3/06* (2006.01)
*H04W 56/00* (2009.01)
*H04Q 9/04* (2006.01)
*H04W 84/18* (2009.01)
*H04W 84/06* (2009.01)

(52) U.S. Cl.
CPC ............ *H04J 3/0658* (2013.01); *H04Q 9/04* (2013.01); *H04W 56/0015* (2013.01); *H04W 84/06* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,577,872 | B1* | 6/2003 | Lundh et al. | 455/502 |
| 2006/0128311 | A1* | 6/2006 | Tesfai | 455/67.11 |
| 2007/0140303 | A1* | 6/2007 | Kim et al. | 370/503 |
| 2008/0310321 | A1* | 12/2008 | Grilli et al. | 370/252 |
| 2009/0219883 | A1* | 9/2009 | Cho et al. | 370/330 |
| 2011/0255528 | A1* | 10/2011 | Zakrzewski | 370/350 |
| 2011/0267269 | A1* | 11/2011 | Tardif et al. | 345/158 |
| 2012/0117272 | A1* | 5/2012 | Lynch et al. | 709/248 |
| 2012/0188997 | A1* | 7/2012 | Zakrzewski et al. | 370/350 |
| 2012/0263165 | A1* | 10/2012 | Zakrzewski et al. | 370/350 |
| 2013/0016625 | A1* | 1/2013 | Murias et al. | 370/254 |
| 2014/0075189 | A1* | 3/2014 | Abraham et al. | 713/168 |
| 2014/0146678 | A1* | 5/2014 | Merlin et al. | 370/235 |

* cited by examiner

*Primary Examiner* — Otis L Thompson, Jr.
(74) *Attorney, Agent, or Firm* — Locke Lord LLP; Scott D. Wofsy; Joshua L. Jones

(57) ABSTRACT

A sensor network includes a plurality of sensors and a base station for sending a series of data acquisition requests to the sensors. Each data acquisition request has an index. Each sensor has a synchronization calculation module and an internal clock. The sensors are adapted and configured to receive the series of data acquisition requests and record a timestamp of receipt for each data acquisition request. The sensors also store a predefined time interval related to the plurality of data acquisition requests so that the sensor can calculate a time to start collecting data based upon the series of data acquisition requests, the timestamps, the indices, and the predefined time interval. In an alternative embodiment, the base station only sends a general request for data acquisition and a synchronization sensor module receives the general request and, in turn, sends the series of data acquisition requests to the sensors.

20 Claims, 4 Drawing Sheets

SYSTEM AND METHOD FOR SYNCHRONIZING WIRELESS DEVICES WITHOUT SENDING TIMESTAMP DATA

BACKGROUND OF THE DISCLOSURE

1. Field of the Disclosure

The subject disclosure relates to communication in sensing, monitoring and control systems, and more particularly to synchronizing wireless devices used on board aircraft without sending timestamp data.

2. Background of the Related Art

In recent years, the aerospace industry has been actively working on using wireless communication as a replacement or augmentation for wired data connections in aircraft systems. Some benefits of wireless as opposed to traditional wired sensors include weight and complexity reductions, simplified installation and maintenance, easier system reconfiguration as well as better diagnostic capabilities. Additionally, new sensing technologies and aircraft subsystems are enabled by utilizing wireless technology, which eliminates additional design and installation costs and limits the additional wiring weight.

Mechanical and structural health monitoring and diagnostic systems particularly benefit from wireless technology. At present, wider use of such systems is hampered by the increased cost and complexity of the required wiring, which can often outweigh the potential gains. If no additional wiring were necessary, such systems might be more readily used, which would lead to significant improvements in maintenance costs and in aircraft reliability.

Most sensing and control systems require some degree of synchronicity between different elements. For example, a mechanical diagnostic system may acquire vibration data from multiple sensors. For correct interpretation of multidimensional vibration data, it is necessary to make sure that the acquired signals correspond to the same intervals in time. The synchronization is typically achieved in one of two ways. The first approach is to devise a method to make sure that all sensors start their data acquisition at the same time. The second approach is to have all sensor nodes measure their local time according to well synchronized clocks.

The two approaches to synchronization are in fact equivalent. If it is possible to command several sensor nodes to perform a certain task starting at the same time, then the task may involve starting or resetting their clocks. If clock resets are done simultaneously, then the clocks will be closely synchronized for some time provided their rates do not differ too much. On the other hand, if the clocks are tightly synchronized, then the sensors may be commanded to perform the task of interest, such as to start data acquisition, at particular time values according to their clocks. In other words, the respective sensor's reading can be correlated in such a way that the readings correspond to the same physical time instance.

Several techniques for synchronization of wireless devices are known and typically involve exchanges of time-stamped messages. Based on known send and receive times of sent messages, offsets and rate differences may be estimated between the clocks of those devices. For example, see "Protocols and architectures for wireless sensor networks" by Holger Karl and Andreas Willig, (published by John Wiley & Sons, Ltd. in the year 2005, which is incorporated herein by reference. See also U.S. patent application Ser. No. 12/941,226, filed on Nov. 8, 2010 and entitled APPARATUS AND METHOD FOR SYNCHRONIZING WIRELESS DEVICES and U.S. patent application Ser. No. 12/799,087, filed on Apr. 16, 2010 and entitled SYNCHRONIZING WIRELESS DEVICES, each of which is incorporated by reference herein in its entirety.

Some common approaches rest on the assumption that propagation and processing delays of the messages are symmetric and statistically constant in time. That is, it is assumed that any random delays in delivering a message from wireless node N1 to the wireless node N2 are distributed in the same way as message delivery delays from wireless node N2 to wireless node N1, and this statistical distribution is stationary in time. Furthermore, the accuracy of the resulting clock synchronization depends on the variability of message delivery delays. Generally, as the variance of message delivery delays gets larger, so does the synchronization error. Therefore, for synchronization to be accurate in this approach, it is desirable to have as little variance in message delivery delays as possible.

SUMMARY OF THE INVENTION

There are problems associated with high level communication protocols when synchronizing is required because there is uncertainty about the exact time of delivery. The latency of a particular message cannot be fully predicted due to high level protocols such as TCP using multiple software layers as well as complicated acknowledgement, retransmission, and packet scheduling algorithms. The unpredictable latency creates a difficulty with performing synchronization of end devices using these high level protocols. Further, the timestamp methods lead to longer radio operation and consequently higher energy use.

The subject disclosure provides wireless technology that meets or exceeds the same requirements for performance and reliability as previously used wired systems. One possible advantage is to eliminate two-way data exchange. Another possible advantage is to shorten the overall duration of synchronization as well as the transmission time. Some radio technologies use more energy when transmitting and less when listening/receiving, but for some radios there is little difference. Thus, another potential advantage to save energy is to put the radio module into a low-power sleep mode more frequently or for a longer period of time.

The subject technology addresses energy usage in wireless sensor networks. If a sensor is powered by a battery or like storage device, the battery must last for years before replacement. Particularly for aircraft applications, the battery should last from major scheduled maintenance to major scheduled maintenance. Unscheduled maintenance for battery replacement would be downtime that results in increased maintenance cost and flight delays. Low power consumption also helps to reduce battery size and lighten the overall system.

An alternative to battery operation is to power the wireless sensors from energy harvesting or scavenging devices. Such devices typically have low power output levels unless the size and weight are increased. Again, minimizing the power consumption advantageously improves system qualities.

The subject disclosure also has recognized and addressed the need to effectively synchronize wireless sensors that operate as subordinate nodes in a star network configuration. The subject disclosure eliminates the need to explicitly include timestamp data in messages between the sensors and the base station. As can be seen in view of the above, the message exchange protocol is simplified, the synchronization process is faster, and energy usage is reduced leading to longer battery life.

Typically, the radio module consumes the largest amount of energy, using a large portion to transmit messages. Significant amounts of energy are also used when the radio module is listening for or receiving messages. As such, reduction of the number and length of transmissions as well as the length of the listening and receiving period will greatly save energy. The subject technology reduces the length of time it takes when the sensor's radio module must be active to perform synchronization, and eliminates the need to send data transmissions from the sensors to the base station during the synchronization period. Whenever receiving or transmitting radio messages is not necessary, the radio module can be put in a sleep state. Shortening and simplifying the synchronization process leads to significant energy savings on the sensor.

Further, the subject technology recognizes the advantages of distributed synchronization rather than centralized synchronization. Typically, data concentrator units acquire data from multiple sensor units, wherein different types of sensors all can communicate with the same data concentrator unit. However, each sensor may have different synchronization requirements. For example, acceleration sensors require tighter synchronization than temperature sensors. In view of the above, it is desirable to move the synchronization tasks to the sensors, if not completely, then as much as possible.

In one embodiment, the subject technology is directed to a method for synchronizing a plurality of sensors without exchanging timestamp information, wherein each sensor has a clock. The method includes the steps of receiving, at the plurality of sensors, a series of data acquisition requests having a predefined time interval between the data acquisition requests, wherein each data acquisition request includes an index. The sensors record timestamps for each received request according to the clock of each sensor and determine a clock value to start data acquisition for each timestamp at each sensor based on the timestamps, the respective index, and the predefined time interval. By selecting a minimum clock value for each sensor from the respective clock values, the sensors determine when to start data acquisition for the respective sensor.

In one embodiment, a series of clock values $t_j^{(k)}$ is processed to determine the clock values $t_{aj}^{(k)}$ using a formula $t_{aj}^{(k)} = t_j^{(k)} + (M-j)\Delta + \delta$, where $t_j^{(k)}$ denotes the timestamps, "k" denotes a particular sensor, "j" denotes a number of messages sent in the series, "$\delta$" denotes a time delay, "$\Delta$" denotes the predefined time interval, and "M" denotes a number of messages in the series.

In another embodiment, a series of clock values $t_j^{(k)}$ is processed to determine the clock values $t_{aj}^{(k)}$ using a formula $t_{aj}^{(k)} = t_j^{(k)} + i\Delta + \delta$, where $t_j^{(k)}$ denotes the timestamps, "k" denotes a particular sensor, "i" denotes a number of messages left in the series as the index, "$\delta$" denotes a time delay, and "$\Delta$" denotes the predefined time interval.

The method may also include the step of using a base station to send at least one data acquisition request. An optional synchronization node may receive the at least one data acquisition request and, in turn, send the series of data acquisition requests. For robustness, the sensors can begin collecting data at the minimum clock value calculated even if the complete series has not been received.

In another embodiment, the subject technology is a method including the steps of receiving, at the plurality of sensors, a series of data acquisition requests having a predefined time interval $\Delta$ between the data acquisition requests, wherein each data acquisition request includes an index "j", recording timestamps $t_j^{(k)}$ for each received request according to the clock of each sensor, wherein "k" denotes an index of a particular sensor, and calculating a clock value $t_a^{(k)}$ for starting data acquisition at each sensor based upon the predefined time interval $\Delta$, the index "j" and the recorded timestamps $t_j^{(k)}$. In one embodiment, data acquisition is not done for each timestamp but rather data acquisition occurs after all timestamps are recorded and then processed.

The method may also determine a time to start the data acquisition by selecting a minimum calculated clock value $t_a^{(k)}$ for each sensor as the time to start the data acquisition for each sensor. The minimum of the clock values $t_a^{(k)}$ can be used to reset the sensors clocks to a predefined value.

The method can also calculate a mean value of the clock values $t_a^{(k)}$ and use the mean value to determine a time to start the data acquisition for the respective sensor or calculate a median value of the estimated clock values $t_a^{(k)}$ and use the median value to determine a time to start the data acquisition for the respective sensor. A base station can send at least one data acquisition request or the series of data acquisition requests. If the base station sends only one data acquisition request, an optional synchronization node can receive the at least one data acquisition request and, in turn, send the series of data acquisition requests to the sensors.

One embodiment is a sensor network including a plurality of sensors and a base station for sending a series of data acquisition requests to the sensors. Each data acquisition request has an index. Each sensor has a synchronization calculation module and an internal clock. The sensors are adapted and configured to receive the series of data acquisition requests and record a timestamp of receipt for each data acquisition request. The sensors also store a predefined time interval related to the plurality of data acquisition requests so that the sensor can calculate a time to start acquiring data based upon the series of data acquisition requests, the timestamps, the indices, and the predefined time interval. In an alternative embodiment, the base station only sends a general request for data acquisition and a synchronization sensor module receives the general request and, in turn, sends the series of data acquisition requests to the sensors. The time can be equal to the index times the predefined time interval plus the respective timestamp and an offset. The offset can be zero or any sufficient amount of time to provide robust synchronization. In one embodiment, the offset is equal to the predefined time interval. In one embodiment, once the sensors acquire data, transmission to the base station is controlled relative to the time to avoid energy waste from sensor radio components waiting to transmit acquired data.

It should be appreciated that the present technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The present disclosure overcomes many of the prior art problems associated with synchronizing wireless systems. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference letters and numerals identify similar structural elements.

Figure 1:
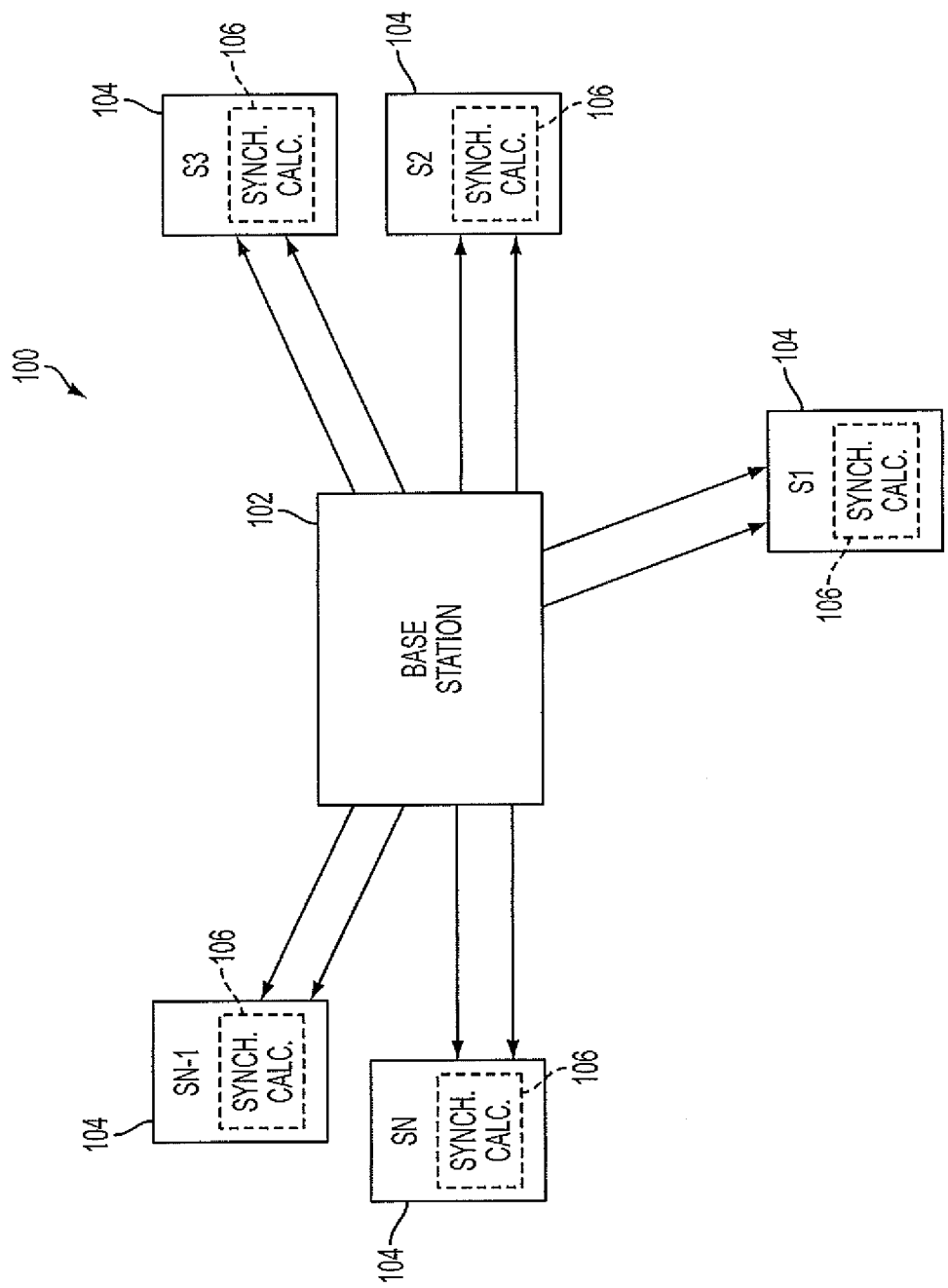
FIG. 1 is a schematic representation of a sensor system having wireless sensors for utilizing synchronization methods in accordance with the subject technology.

Now referring to FIG. 1, a schematic representation of a sensor system 100 utilizing synchronization methods in accordance with the subject technology is shown. The sensor system 100 includes a base station 102 in wireless communication with a plurality of wireless devices such as sensors or sensor nodes 104. The following description pertains to sensor applications but it is envisioned that the subject technology is well-suited to any other wireless communication devices such as those that switch or create actions or simply controllers associated with the same. Typically, the base station 102 serves as a data concentrator and the wireless sensors 104 need to perform data acquisition simultaneously. The base station 102 may also be connected to a plurality of other sensors, whether wired or not, that do not require synchronization. In the sensor system 100, there are N sensors 104, wherein N may be any number and the sensors 104 are individually identified as S1-SN for ease of reference. Each sensor 104 includes a synchronization calculation module 106.

To acquire data synchronously from the sensors, the base station 102 sends a series of data acquisition requests or messages to all the sensors 104 using a broadcast or multicast mode, wherein a multicast is when the broadcast is to selected devices. There are a predetermined number of at least two data acquisition requests sent to all the sensors 104. The interval between the consecutive requests is known to both the base station 102 and the sensors 104. Preferably, the base station 102 includes a precise clock to schedule the series of data acquisition requests in the designated intervals to create the predetermined gaps between messages.

Notably, the data acquisition requests do not include timestamp information, which reduces the size of the data packet and associated transmission time. Instead, each data acquisition request includes a sequence number from 1 to M, wherein M represents any number of messages. By including a sequence number, the wireless sensors 104 are provided with the necessary information to determine the consecutive number of messages received. The numbering of the messages may be from 1 to M or in reverse from M to 1.

However, the sensors 104 do not respond to the acquisition requests immediately. Instead, each sensor 104 receives the messages, records the arrival times, and performs synchronization calculations in the synchronization calculation module 106 to establish the time to begin the respective data acquisition. Each sensor 104 performs these calculations independently without further communication with the base station 102 or between the sensors 104.

Once the sensors 104 complete the calculations, the sensors 104 are ready to perform the data acquisitions. Preferably, the sensors 104 also include precise clocks (not shown) to schedule the calculated actions. Although the sensor clocks do not need to be synchronized, the clock rates being the same or similar facilitates accuracy in the synchronization process. Similarly, the base station 102 has also determined when the sensors 104 are to acquire data.

Once the data acquisition period has passed, the base station 102 sends individual data requests to all of the sensors 104. Each sensor 104 responds to the data request with the respective set of acquired data. For large data sets, the data may be divided into packets and sent in consecutive messages.

Figure 2:
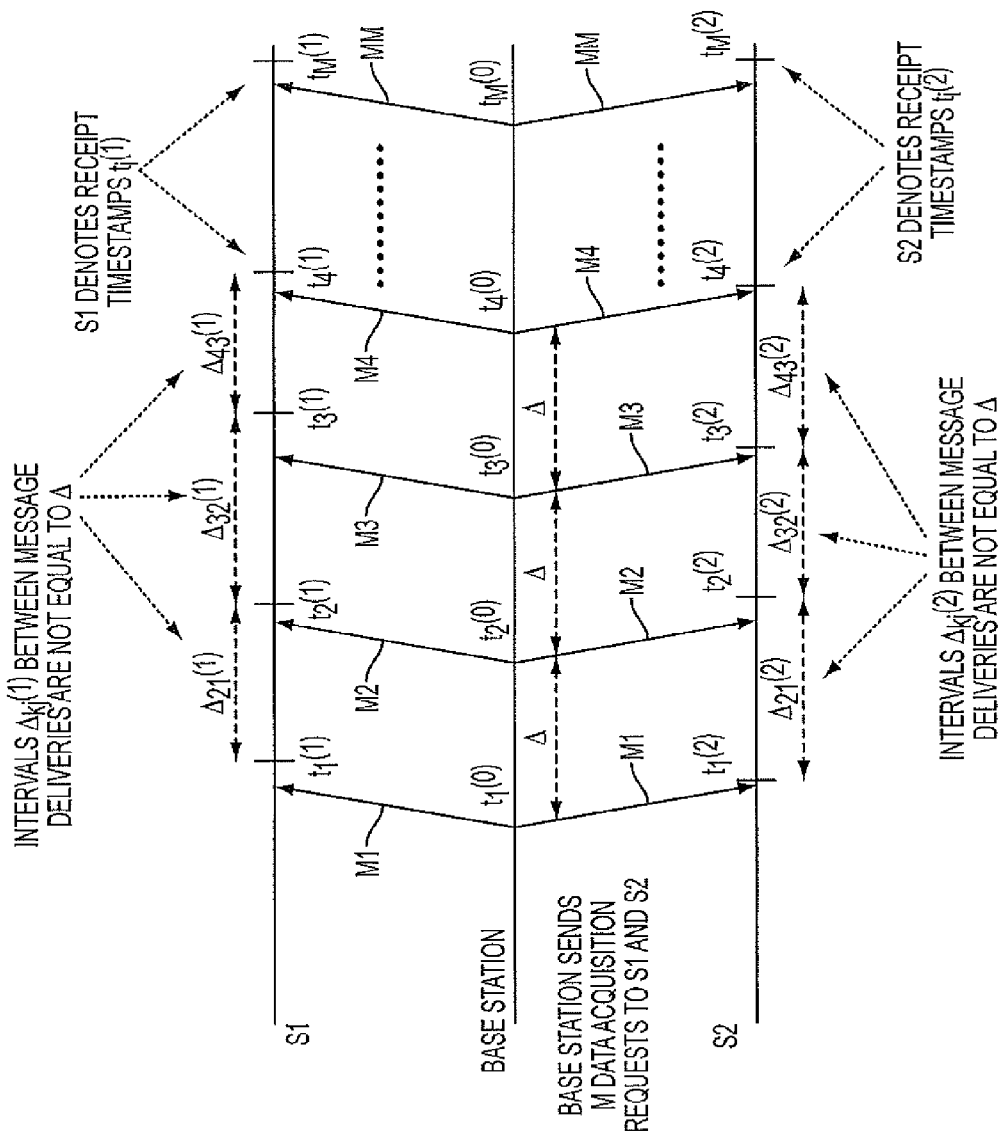
FIG. 2 is an exemplary series of messages between the base station and exemplary two wireless sensors in accordance with the subject technology.

Referring now to FIG. 2, an exemplary series of messages between the base station 102 and an exemplary two wireless sensors 104 in accordance with the subject technology is shown. Although only S1 and S2 wireless sensors 104 are shown, the subject technology is applicable to any number of sensors 104.

Acquisition Request Sequence

FIG. 2 illustrates the acquisition request sequence. Initially, M data acquisition requests or messages (denoted by M and a sequential number) are sent by the base station 102 at time instances spaced precisely with time interval $\Delta$. As wireless transmissions may not arrive at the sensors 104 with the spacing of $\Delta$ due to the inherent uncertain nature of wireless communication, the receipt at the sensors 104 is effectively randomly delayed. The respective times of receipt at the sensors 104 are denoted by $t_j^{(1)}$ and $t_j^{(2)}$, respectively. FIG. 2 also depicts the interval between message for S1 sensor 104 as $\Delta_{kj}^{(1)}$ and for S2 sensor 104 as $\Delta_{kj}^{(2)}$.

For example, the time interval $\Delta_{32}^{(2)} = t_3^{(2)} - t_2^{(2)}$ is shorter than $\Delta$ because the second message M2 is delivered at S2 sensor 104 later than at S1 sensor 104 (e.g., relatively delayed) while the third message M3 is delivered relatively earlier. Similarly, the time interval $\Delta_{32}^{(1)} = t_3^{(1)} - t_2^{(1)}$ is longer than $\Delta$ because the second message M2 is relatively promptly delivered at S1 sensor 104 while the third message M3 is relatively delayed in delivery at S1 sensor 104. With random error introduction, it is not possible to accurately predict the timing of the delivery of the messages M.

Synchronization Calculations

As can be seen from FIG. 2, each sensor 104 records the time at which the acquisition request messages are received but does not have any information regarding when other sensors received the same message. Although the delivery delays are random, it can be assumed that some messages are delivered with minimal or small delays. For these promptly delivered messages, the time for the message to propagate is deterministic. In other words, the random component of the delay is minimized. If the sensors 104 can determine which messages are delivered with the smallest random delay component, then that message is desirably used as the synchronization basis. In the sensor system 100, the sensors 104 determine which of the messages represents the smallest time delay based upon the receipt timestamps $t_j^{(k)}$ as described herein with respect to FIG. 3.

Figure 3:
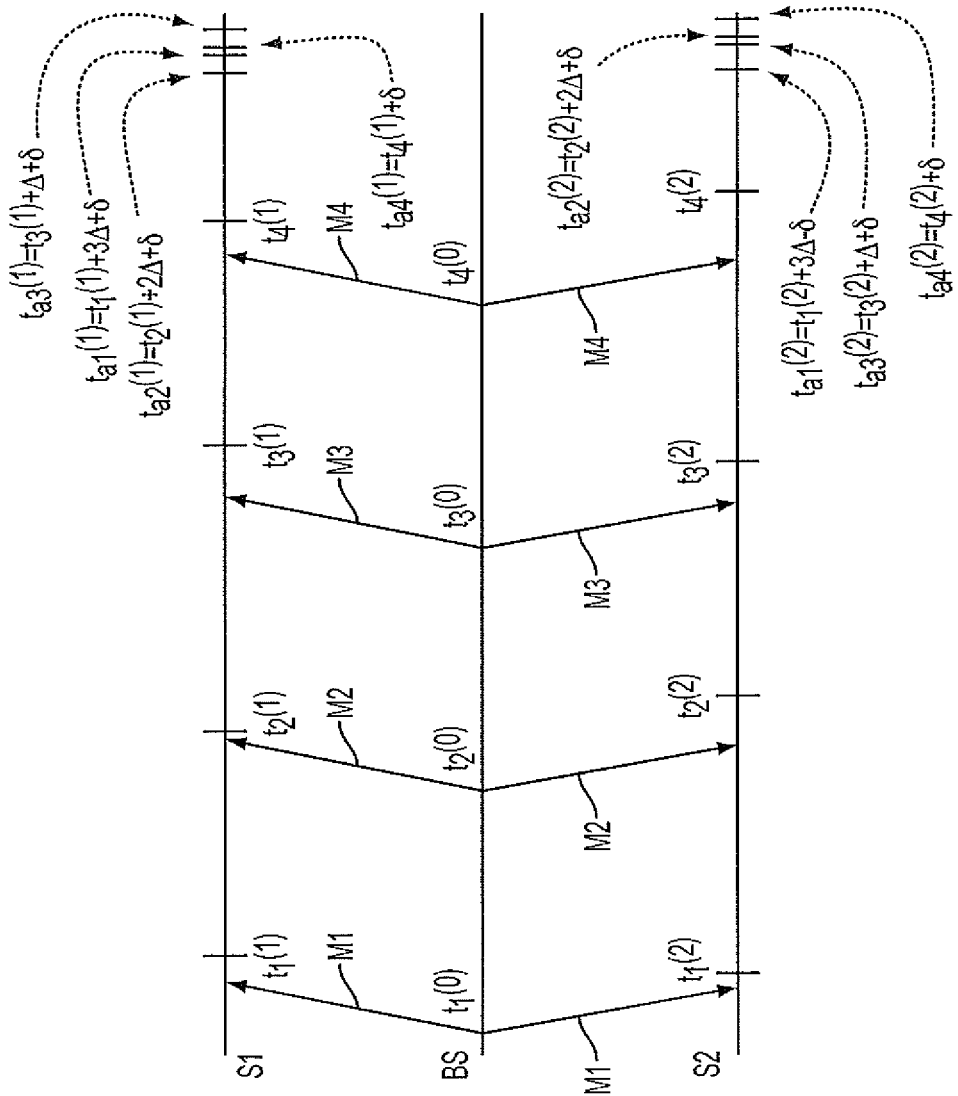
FIG. 3 is a schematic representation of the synchronization calculations for two sensors and four messages in accordance with the subject technology.

Referring now to FIG. 3, the synchronization calculations are shown schematically for two sensors 104 (e.g., N=2) and four messages (M=4). Generally, when the sensors 104 receive the j-th data acquisition request from the base station 102, the sensors 104 note the receipt timestamp $t_j^{(k)}$. The data acquisition request does include a serial number j as part of the message. As the sensor expects M acquisition requests to be sent from the base station, the number of messages yet to arrive is M−j. Thus, the time for delivery of the last message is estimated to be (M−j)$\Delta$.

Without random delays, the data acquisition could be scheduled to start at time $t_j^{(k)}+(M-j)\Delta$. However, due to the random delays, some additional time margin $\delta$ may be required to start the data processing and acquisition. Thus, the time calculated by the synchronization calculation modules 106 to schedule the acquisition is $t_{aj}^{(k)}=t_j^{(k)}+(M-j)\Delta+\delta$. Upon completion of receipt of M data acquisition requests, each sensor has calculated M estimates of $t_{aj}^{(k)}$. The sensors 104 select the minimum of the estimates as the time to start the data acquisition, i.e., $t_a^{(k)}=\min(t_{aj}^{(k)})$ assuming that this minimum likely corresponded to the minimal random delay, which corresponds to the best choice for scheduling purposes.

Referring more particularly to FIG. 3, for S1 sensor 104, the second message M2 was received the fastest. Thus, the corresponding estimate for the minimal value of the four $t_{aj}^{(1)}$ times is $t_{a2}^{(1)}=t_2^{(1)}+(4-2)\Delta+\delta$. For S2 sensor 104, the first message M1 was received the fastest. Thus, the corresponding estimate for the minimal value of the four times $t_{aj}^{(2)}$ is $t_{a1}^{(2)}=t_1^{(2)}+(4-1)\Delta+\delta$. As can be seen, two estimates $t_a^{(1)}=t_{a2}^{(1)}$ and $t_a^{(2)}=t_{a1}^{(2)}$ correspond to time instants that are very close to each other even though for each radio message, the receipt timestamps on both sensors 104 were different.

Preferably, the time margin $\delta$ is large enough so that none of the estimates $t_{aj}^{(k)}=t_j^{(k)}+(M-j)\Delta+\delta$ is less than the last receipt timestamp $t_M^{(k)}$ corresponding to the M-th message. In some configurations, the random variability of the message delay may be distributed approximately according to a uniform distribution. Then, the time margin $\delta$ is chosen as greater than the width of the delay distribution.

In configurations where the random delays are not bounded, the sensors 104 may stop waiting for additional messages when the clock reaches the minimal of the estimates calculated at that time. For example, after receipt of each message, the sensors 104 update the best or minimal estimate calculated from the messages received. When the clock value reaches that minimal estimate, the sensors 104 start the data acquisition without waiting for any new messages. It is envisioned that the actual data acquisition may be triggered at a desired time through, for example, a timer-based interrupt.

In one embodiment, the value of the time interval $\Delta$ may be adjusted by the base station 102 during sensor system 100 operation according to the operating environment. The new value of the time interval $\Delta$ is simply communicated to the sensors 104 in a separate message prior to the synchronization process or even included with the data acquisition requests.

The choice of the time margin $\delta$ depends upon the implementation of the software in the sensor system 100. In one embodiment, the value for the time margin $\delta$ is zero. For example, the sensor system 100 may employ interrupt-driven data acquisition. When the clock reaches the minimal value $t_a^{(k)}$, then any message arriving after that time instant will not lead to any changes in scheduling. As a result, any subsequent messages may be ignored and the sensor 104 proceeds to data acquisition directly. In another embodiment, the sensor system 100 processes any messages already in the queue prior to starting data acquisition. In this embodiment, it is preferable to utilize a time margin $\delta$ that is large enough to guarantee that all messages are processed prior to $t_a^{(k)}$. Additionally, the time margin $\delta$ may be set equal to the time interval $\Delta$ to simplify calculations.

Dealing with Message Losses

If some of the messages are lost, then synchronization accuracy may be affected. Consequently, the number M of messages sent should be large enough so that the number of messages received creates a robust system with the desired accuracy level. As noted above, by starting data acquisition when the minimum calculated start time occurs, the sensors 104 will not be hung up awaiting delivery of all the messages. If additional preparatory actions are required prior to starting data acquisition, a preparatory time delay d may be chosen so that the waiting for the last message is broken when the clock reaches $t_a^{(k)}-d$. Preferably, the preparatory time delay d is less than the time margin $\delta$.

Reverse Message Counting

In view of the possibility of some messages being lost, it is desirable to have each data acquisition request include the number of remaining messages to be sent (e.g., M-j) instead of the number of messages sent (e.g., j) for use in the calculation of the time to start the data acquisition $t_{aj}^{(k)}=t_j^{(k)}+(M-j)\Delta+\delta$. In effect, the sensor system 100 uses reverse message counting from M-1 to zero instead of counting up from 1 to M. Advantageously, the sensors 104 do not need to know the total number of messages to be sent by the base station 102. If a sent index i is used to represent the number of messages remaining, then the scheduled start time formula becomes $t_{aj}^{(k)}=t_j^{(k)}+i\Delta+\delta$. In another embodiment, the reverse message counting goes from M to 1, in which case the scheduled start time formula becomes $t_{aj}^{(k)}=t_j^{(k)}+(i-1)\Delta+\delta$. As long as the message index i decreases by 1, a variety of schemes can be used.

Statistical Approaches to Calculating the Data Acquisition Time

Using the minimum formula of $t_a^{(k)}=\min t_{aj}^{(k)}$ for calculating the data acquisition time is a generally applicable approach. However, if the statistical distribution of random message delivery delays is known, an alternative method of computing the data acquisition time $t_a^{(k)}$ based on the collection of individual values $t_{aj}^{(k)}$ may be used. Estimation theory can derive the best estimate for the particular statistical distribution and for the particular quality criterion. For example, see Chapter 4 of "The Bayesian Choice" by Christian P. Robert (published by Springer Science+Business Media, LLC in the year 2007) which addresses the optimal parameter estimation problem. Preferably, the sensor system 100 uses the same approach for each sensor 104.

Scheduling Sensor Clocks

An alternative method to scheduling the sensor data acquisition time is to adjust or synchronize the sensor clocks. Instead of starting the data acquisition at time $t_a^{(k)}$, the sensor clocks are reset to zero or another predefined value. Thus at time $t_a^{(k)}$, the sensors 104 have clocks that are tightly synchronized. The synchronized sensors 104 can then schedule actions that should take place simultaneously and correlate data between multiple sensors 104.

Switching Off Sensor Radios

As can be seen from the subject disclosure, the data traffic is reduced and the sensors do not need to transmit data during the synchronization process. Consequently, the radio usage and associated power consumption is reduced. Further, once the sensors 104 have received and processed the last data acquisition request message, a radio component of the sensor 104 may be simply turned off or put into a low-power sleep mode for the duration of the data acquisition. The radio component may even be turned off before the data acquisition period such as at the time $t_a^{(k)}-d$.

Upon completion of the data acquisition, the sensors 104 switch the radio components on and off as necessary to transmit the acquired data. It is also envisioned that instead of switching components on and off, the component may simply be put in a low power sleep mode to allow for fast wake up. The timing of the data transmission is also tightly controlled relative to the calculated start data acquisition time $t_a^{(k)}$. Thus, further energy waste is avoided by not having the sensor radio components on while waiting to transmit acquired data.

Synchronization Source Node Embodiment

Figure 4:
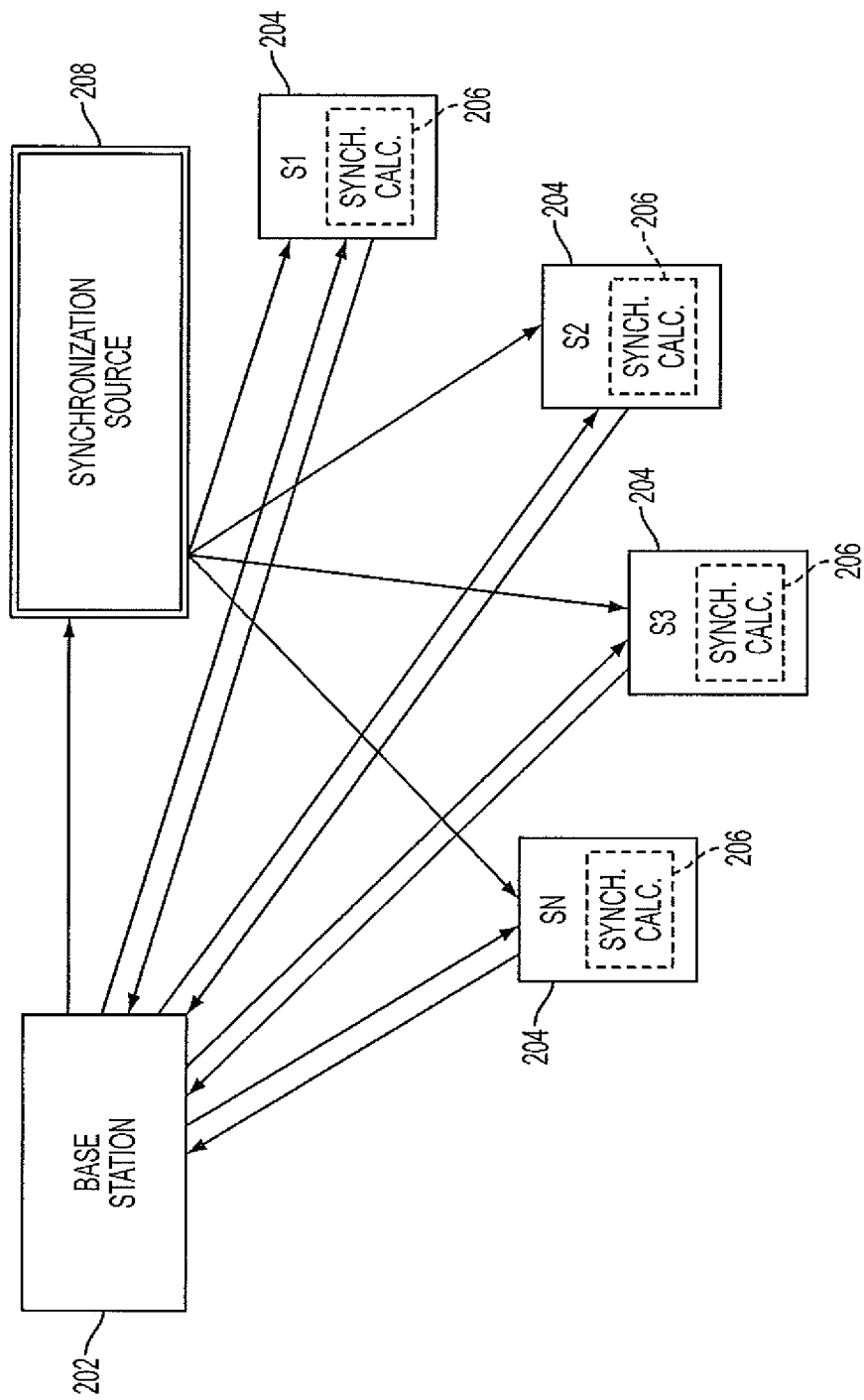
FIG. 4 is a schematic representation of another sensor system having wireless sensors utilizing a synchronization source node in accordance with the subject technology.

Now referring to FIG. 4, another embodiment of a sensor system 200 in accordance with the subject technology is shown. As will be appreciated by those of ordinary skill in the pertinent art, the sensor system 200 utilizes similar principles to the sensor system 100 described above. Accordingly, like reference numerals preceded by the numeral "2" instead of the numeral "1", are used to indicate like elements. The primary difference of the sensor system 200 in comparison to the sensor system 100 is the addition of a synchronization source node 208. The synchronization source node 208 allows removing the base station 202 from the synchronization process. For example, the base station 202 may be from a different vendor and use different standards for communication and the like than the sensors 204 or simply not support the specific synchronization process. The synchronization source node 208 may be a sensor configured such that the synchronization source node 208 does not need to be tightly synchronized with the other sensors 204. In another embodiment, the synchronization source node 208 is simply additional hardware to facilitate the synchronization process.

During synchronization of the sensor system 200, the base station 202 sends the same data acquisition request broadcast to all sensors 204 without any additional synchronization information. However, the sensors 204 ignore this base station request. Upon receiving the base station request, the synchronization source node 208 begins sending a series of M data acquisition request broadcasts (or multicasts) directed to all the sensors 204. Then, the sensors 204 perform the synchronization process as described above. After acquisition of the data, the sensors 204 communicate directly with the base station 202 so that, from the perspective of the base station 202, the data acquisition and reporting process is unchanged. But, the synchronization source node 208 has translated the single request by the base station 202 into the required series of request messages that enable the synchronization process.

It is envisioned that the subject technology includes adjusting the number of messages sent to advantageously perform synchronization while minimizing the time and energy used for the synchronization process. One or more of the messages in the series may also include the total number of messages in the series. Further, the subject technology is not limited to sensor applications and may synchronize any type of devices now known or later developed.

While the invention has been described with respect to preferred embodiments, those skilled in the art will readily appreciate that various changes and/or modifications can be made to the invention without departing from the spirit or scope of the invention as defined by the appended claims. For example, each claim may depend from any or all claims in a multiple dependent manner even though such has not been originally claimed.

What is claimed is:

1. A method for synchronizing a plurality of wireless devices without exchanging timestamp information, wherein each wireless device has a clock, the method comprising the steps of:
   receiving, at the plurality of wireless devices, a series of data acquisition requests having a predefined time interval between the data acquisition requests, wherein each data acquisition request includes an index;
   recording timestamps of receipt for each received request according to the clock of each wireless device;
   determining a clock value to start data acquisition for each timestamp at each wireless device based on the timestamps, the respective index, and the predefined time interval; and
   selecting a minimum clock value for each wireless device from the respective clock values as an instant to start data acquisition for the respective wireless device.

2. A method as recited in claim 1, wherein a series of clock values $t_j^{(k)}$ is processed to determine the clock values $t_{aj}^{(k)}$ using a formula $t_{aj}^{(k)}=t_j^{(k)}+(M-j)\Delta+\delta$, where $t_j^{(k)}$ denotes the timestamps, "k" denotes a particular wireless device, "j" denotes a number of messages sent in the series, "δ" denotes a time delay, "Δ" denotes the predefined time interval, and "M" denotes a number of messages in the series.

3. A method as recited in claim 1, wherein a series of clock values $t_j^{(k)}$ is processed to determine the clock values $t_{aj}^{(k)}$ using a formula $t_{aj}^{(k)}=t_j^{(k)}+i\Delta+\delta$, where $t_j^{(k)}$ denotes the timestamps, "k" denotes a particular wireless device, "i" denotes a number of messages left in the series as the index, "δ" denotes a time delay, and "Δ" denotes the predefined time interval.

4. A method as recited in claim 1, further comprising the step of using a base station to send at least one data acquisition request.

5. A method as recited in claim 4, further comprising the step of using a synchronization node to receive the at least one data acquisition request and, in turn, send the series of data acquisition requests.

6. A method as recited in claim 1, wherein the wireless devices are sensors and the sensors begin collecting data at the minimum clock value calculated even if the complete series has not been received.

7. A method for synchronizing a plurality of sensors without timestamp information, wherein each sensor has a clock, the method comprising the steps of:
   receiving, at the plurality of sensors, a series of data acquisition requests having a predefined time interval A between the data acquisition requests, wherein each data acquisition request includes an index "j";
   recording timestamps $t_j^{(k)}$ of receipt for each received request according to the clock of each sensor, wherein "k" denotes the number of sensors; and
   calculating a clock value $t_a^{(k)}$ for starting data acquisition at each sensor for each timestamp $t_j^{(k)}$ based upon the predefined time interval Δ, the index "j" and the timestamps $t_j^{(k)}$.

8. A method as recited in claim 7, further comprising the step of determining a time to start the data acquisition by selecting a smallest calculated clock value $t_a^{(k)}$ for each sensor as the time to start the data acquisition for each sensor.

9. A method as recited in claim 7, wherein a smallest of the clock values $t_a^{(k)}$ is used to reset the sensors clocks to a predefined value.

10. A method as recited in claim 7, further comprising the step of calculating a mean value of the clock values $t_a^{(k)}$ and using the mean value to determine a time to start the data acquisition for the respective sensor.

11. A method as recited in claim 7, further comprising the step of calculating a median value of the estimated clock values $t_a^{(k)}$ and using the median value to determine a time to start the data acquisition for the respective sensor.

12. A method as recited in claim 7, further comprising the step of using a base station to send at least one data acquisition request.

13. A method as recited in claim 12, wherein the base station sends the series of data acquisition requests.

14. A method as recited in claim 12, further comprising the step of using a synchronization node to receive the at least one data acquisition request and, in turn, send the series of data acquisition requests.

15. A sensor network comprising:
   a plurality of sensors, each sensor having an internal clock, wherein the sensors are adapted and configured to:
      receive a series of data acquisition requests having a predefined time interval between the data acquisition requests, wherein each data acquisition request has an index;
      record a timestamp of receipt for each data acquisition request;
      store the predefined time interval related to the plurality of data acquisition requests; and
      calculate a time to start collecting data based upon the series of data acquisition requests, the timestamps, the indices, and the predefined time interval.

16. A sensor network as recited in claim 15, wherein the time is equal to the index times the predefined time interval plus the respective timestamp and an offset.

17. A sensor network as recited in claim 16, wherein the offset is approximately equal to the predefined time interval.

18. A sensor network as recited in claim 15, further comprising a base station for sending the series.

19. A sensor network as recited in claim 18, wherein once the sensors acquire data, transmission to the base station is controlled relative to the time to avoid energy waste from sensor radio components waiting to transmit acquired data.

20. A sensor network as recited in claim 15, further comprising a base station for sending a general request for data acquisition and a synchronization sensor module for receiving the general request and, in turn, sending the series.

* * * * *